US006325109B1

(12) United States Patent
Podesta'

(10) Patent No.: US 6,325,109 B1
(45) Date of Patent: Dec. 4, 2001

(54) METHOD AND MACHINE FOR PRODUCING A CONTINUOUS-THREAD DISK ELEMENT, AND DISK ELEMENT PRODUCED USING SUCH A METHOD

(75) Inventor: Emanuele Podesta', Brindisi (IT)

(73) Assignee: Fiatavio S.p.A., Turin (IT)

( * ) Notice: Subject to any disclaimer, the term of this patent is extended or adjusted under 35 U.S.C. 154(b) by 0 days.

(21) Appl. No.: 08/982,040

(22) Filed: Dec. 1, 1997

(30) Foreign Application Priority Data

Dec. 3, 1996 (IT) .............................................. TO96A0979

(51) Int. Cl.[7] .................................................. D03D 41/00
(52) U.S. Cl. ...................... 139/DIG. 1; 139/11; 139/16; 442/205; 442/206
(58) Field of Search ............................ 139/DIG. 1, 1 R, 139/11, 457, 16; 442/205, 206, 218, 226, 134, 148, 175, 179

(56) References Cited

U.S. PATENT DOCUMENTS

| | | | |
|---|---|---|---|
| 2,624,367 | * | 1/1953 | Dunod ..................................... 139/16 |
| 2,690,194 | * | 9/1954 | Latieyle .................................. 139/16 |
| 3,750,714 | * | 8/1973 | Holman, Jr. et al. ................... 139/16 |
| 4,260,441 | | 4/1981 | Prewo . |
| 4,490,201 | * | 12/1984 | Leeds . |
| 5,070,914 | * | 12/1991 | Fukuta et al. ...................... 139/384 R |
| 5,091,246 | * | 2/1992 | Yasui et al. ........................... 442/205 |
| 5,130,188 | * | 7/1992 | Anahara et al. ..................... 442/205 |

FOREIGN PATENT DOCUMENTS

| | | | |
|---|---|---|---|
| 0 710 728 | | 8/1996 | (EP) . |
| 2 168 032 | | 6/1986 | (GB) . |
| 01201550 | * | 8/1989 | (JP) ....................................... 28/143 |

OTHER PUBLICATIONS

Patent Abstracts of Japan, vol. 14, No. 548, Dec. 5, 1990, and JP 02 234944 A (Ashimori Ind. Co. Ltd.).

* cited by examiner

*Primary Examiner*—John J. Calvert
*Assistant Examiner*—Robert H. Muromoto, Jr.
(74) *Attorney, Agent, or Firm*—Shlesinger, Arkwright & Garvey LLP

(57) ABSTRACT

A method and machine whereby a continuous-thread disk element from which to form composite materials is formed by winding a thread of reinforcing material about an axis to form a flat coil having a number of turns, and by locking the turns with respect to one another by means of binding threads wound about each turn; the turns being equally spaced with a given spacing by forming, simultaneously with the formation of the coil, a further two flat coils of spacer thread, which are removed from the reinforcing-thread coil once the binding threads are wound about the turns.

8 Claims, 4 Drawing Sheets

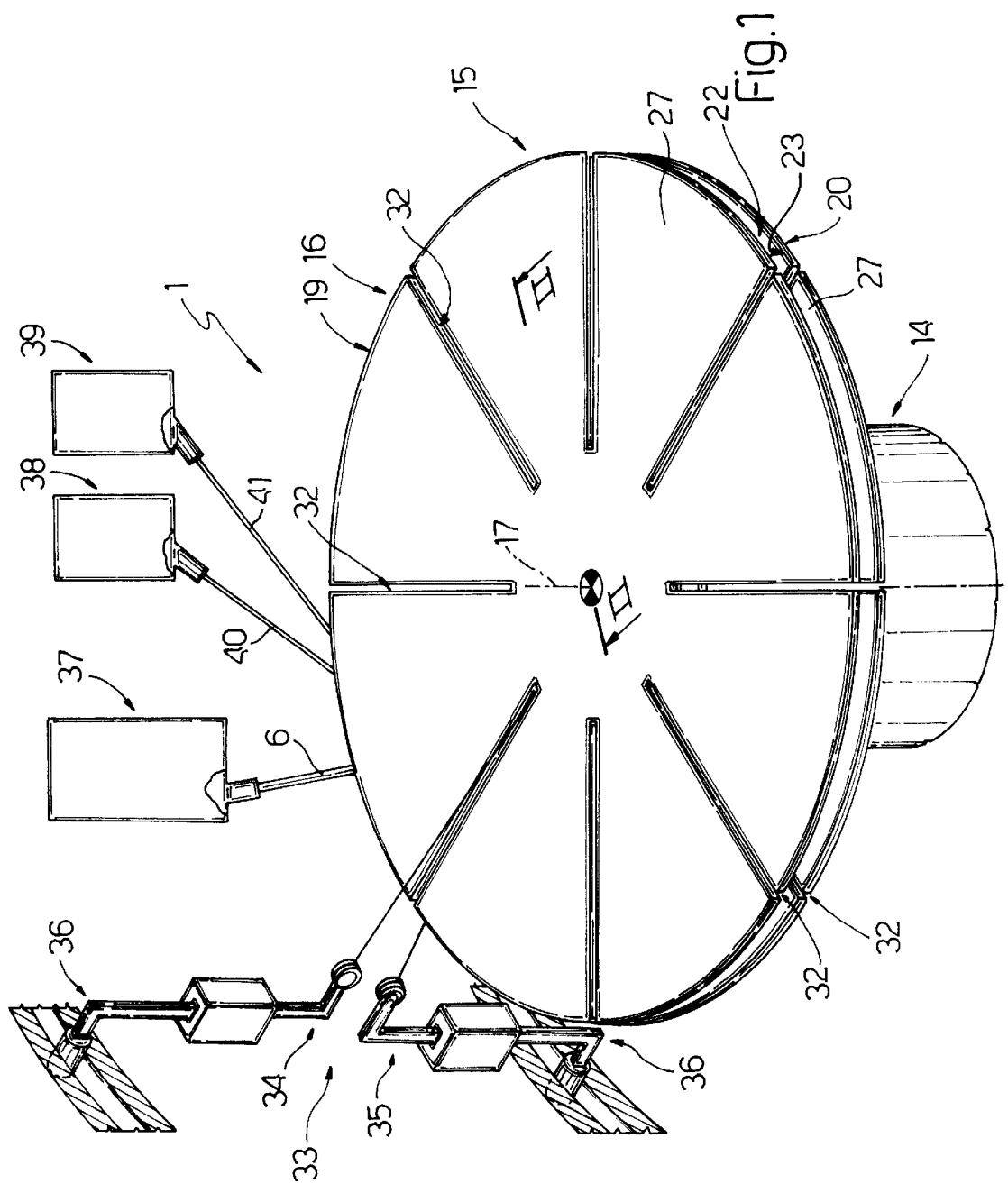

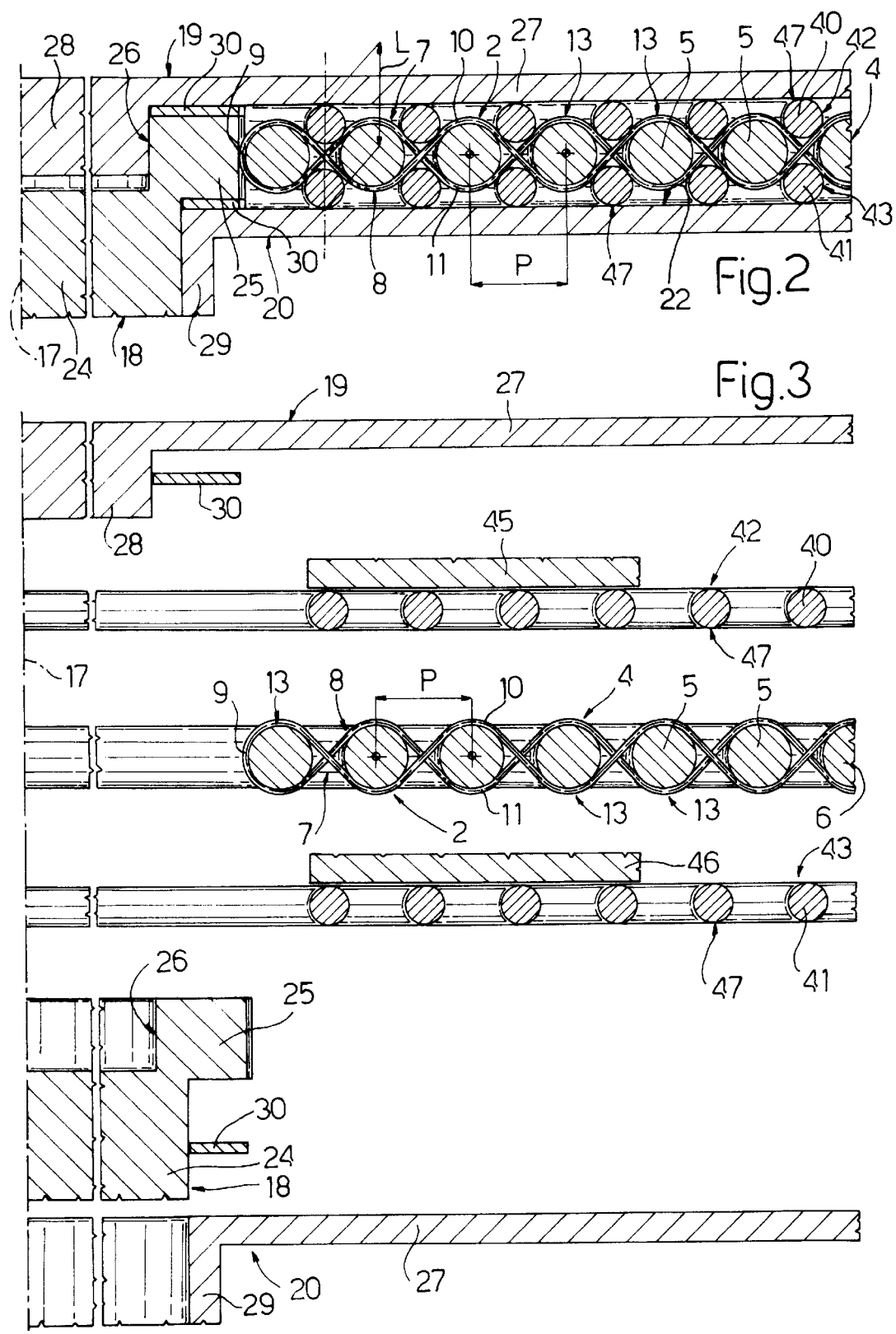

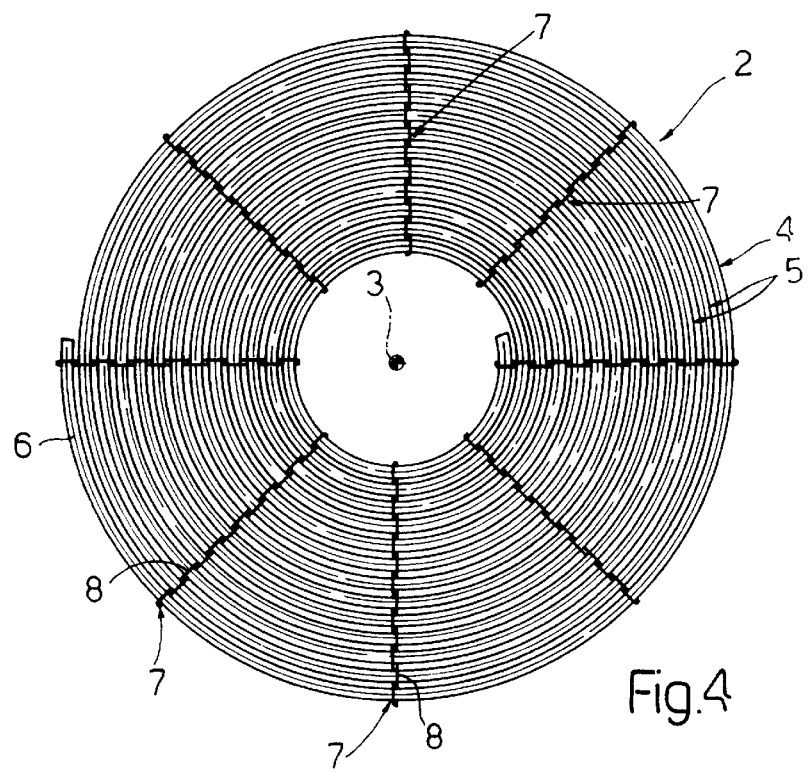
Fig.4
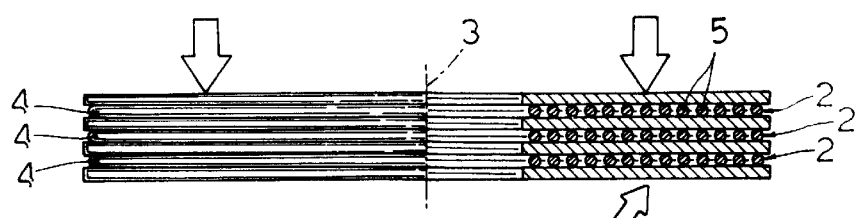
Fig.6
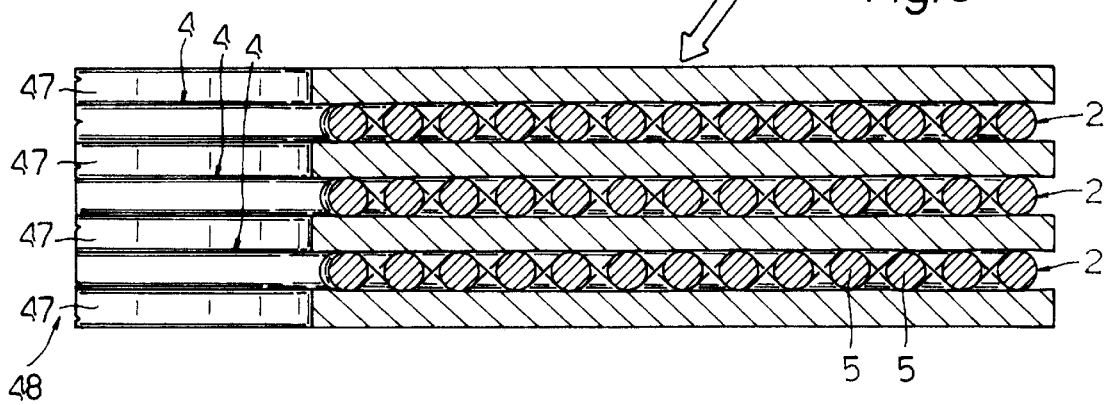

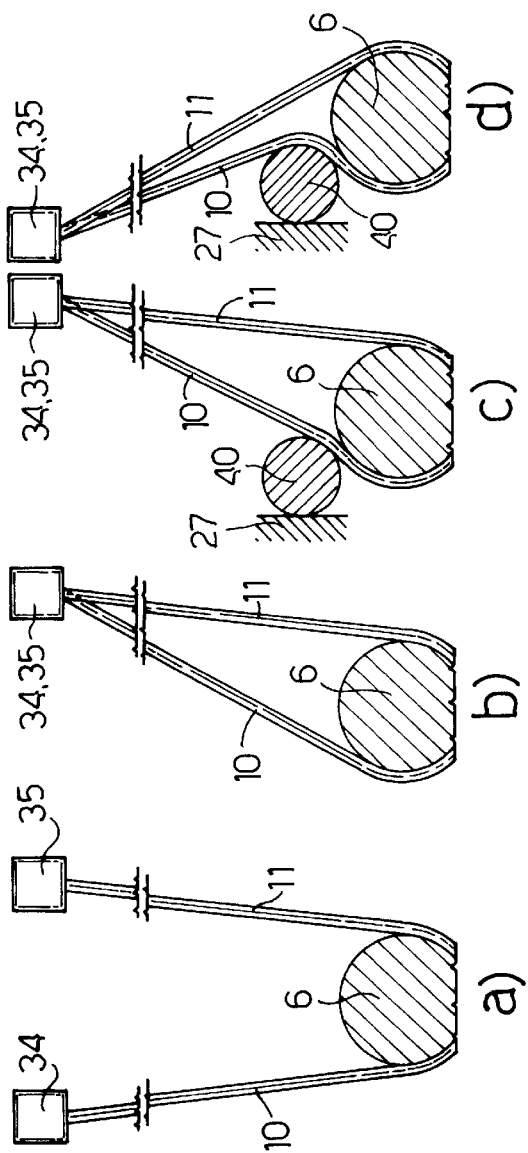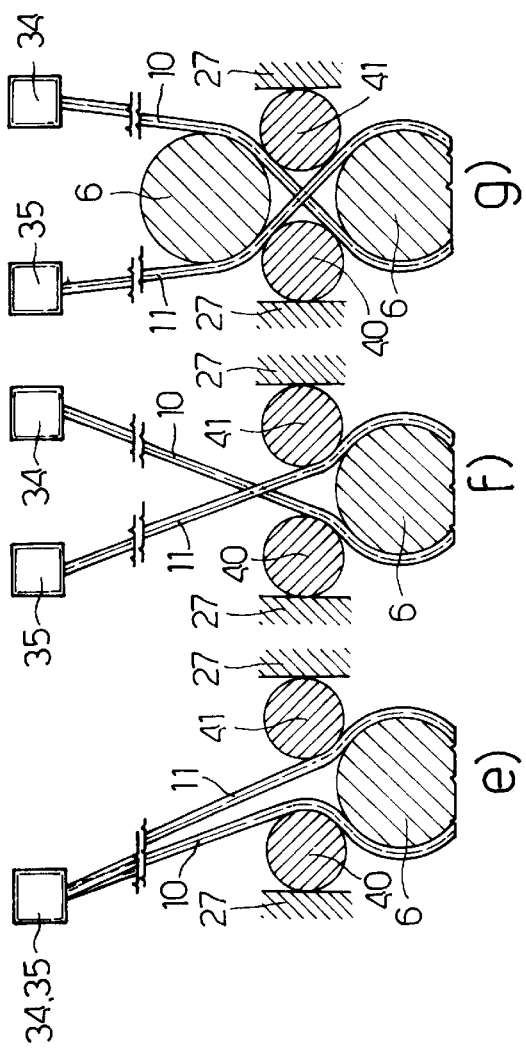
Fig. 5

METHOD AND MACHINE FOR PRODUCING A CONTINUOUS-THREAD DISK ELEMENT, AND DISK ELEMENT PRODUCED USING SUCH A METHOD

BACKGROUND OF THE INVENTION

The present invention relates to a method of producing a continuous-thread disk element from which to form composite materials.

In British Patent Application n. 2 168 032 filed on Oct. 2, 1985, composite materials are produced by forming a number of disks, each obtained by winding a continuous reinforcing thread about an axis to form a flat coil; stacking the disks with a matrix spacer sheet between each disk and the next; and axially compacting the stack so formed to obtain a matrix in which the various coils of reinforcing thread are embedded.

The physical characteristics of the composite materials obtained as described above mainly depend on the distribution of the reinforcing threads inside the matrix; and homogeneous distribution of the threads depends on the extent to which the turns in each disk are equally spaced, and the extent to which the freedom of movement of the various turns is limited, especially during compression.

In British Patent Application n. 2 168 032, the turns in each disk are spaced and locked with respect to one another by interposing between each turn and the next a continuous spacer bead, which is wound simultaneously with the reinforcing thread about the axis of the disk, and is connected to the reinforcing thread by means of a binding material, preferably an acrylic resin.

In the above method, the mutual position of the turns of reinforcing thread, i.e. the distance between one turn and the next, depends on the geometric characteristics of the spacer bead, which must be sized in each case according to the desired distribution of the reinforcing thread inside the matrix, and must be made of different materials, depending on the matrix involved, so that production time and cost are obviously fairly high.

Moreover, the above method is also unsatisfactory by failing to allow a reduction, below a relatively high minimum threshold value, in the spacing or distance between the turns in each disk, and in the thickness of the reinforcing thread disks themselves. In fact, the materials and known techniques normally used to form the beads impose a minimum transverse dimension of the beads, which is normally always greater than the minimum transverse dimension of the reinforcing threads, so that the above known method fails to provide for producing composite materials with any reinforcing thread distribution or density.

SUMMARY OF THE INVENTION

It is an object of the present invention to provide a straightforward, low-cost method of producing a continuous-thread disk element, designed to eliminate the aforementioned drawbacks.

According to the present invention, there is provided a method of producing a continuous-thread disk element from which to produce composite materials, the method comprising the steps of feeding a continuous first thread to a winding station; winding the continuous first thread about an axis to form a flat first coil comprising a number of first turns; and locking the first turns in fixed positions with respect to one another; characterized in that locking the first turns with respect to one another comprises the steps of inserting removable spacer elements between each first turn and the adjacent first turn; winding binding thread elements about at least an intermediate portion of each first turn to form a binding solely surrounding the intermediate portions of said first turns; and removing said spacer elements from said first coil.

The present invention also relates to a machine for producing a continuous-thread disk element from which to produce composite materials.

According to the present invention, there is also provided a machine for producing a continuous-thread disk element from which to produce composite materials, the machine comprising a winding station; supply means for feeding a continuous first thread to the winding station; first winding means for winding said first thread about an axis to form a flat first coil comprising a number of first turns; and connecting means for locking said first turns in fixed positions with respect to one another; characterized in that said connecting means comprise feeding and positioning means for inserting removable spacer elements between each first turn and the adjacent first turn; and manipulating means for winding thread elements about at least an intermediate portion of each first turn to form a binding solely surrounding the intermediate portions of said first turns; gripping means being provided for removing said spacer elements from said first coil.

The present invention also relates to a continuous-thread disk element from which to produce composite materials, preferably rotary bodies of machines and/or aerospace engine parts.

According to the present invention, there is provided a continuous-thread disk element from which to produce composite materials, and comprising a continuous-thread flat coil having a respective axis and a number of turns; and locking means for locking the turns in fixed mutual positions; characterized in that said locking means solely comprise binding thread means extending crosswise to said turns and surrounding the turns at least partially.

BRIEF DESCRIPTION OF THE DRAWINGS

A non-limiting embodiment of the present invention will be described by way of example with reference to the accompanying drawings, in which:

FIG. 1 shows schematically, and with parts removed for clarity, a preferred embodiment of a machine for producing a continuous-thread disk element from which to produce composite materials;

FIG. 2 shows a larger-scale partial section along line II—II in FIG. 1;

FIG. 3 shows an exploded view of the FIG. 2 detail;

FIG. 4 shows a disk element formed using the FIG. 1 machine;

FIG. 5 shows a series of steps in the formation of the FIG. 4 disk element;

FIG. 6 shows a partial section of a composite material formed using a number of the FIG. 4 disk elements.

DETAILED DESCRIPTION OF THE INVENTION

Number 1 in FIG. 1 indicates as a whole a machine for producing a disk element 2 (FIG. 4) having a respective axis 3 and comprising a flat spiral 4 made of ceramic fiber and in turn comprising a number of turns 5 equally spaced with a given spacing P and formed by means of a ceramic thread 6, preferably a silicon carbide thread of about a hundred micron in diameter.

Turns 5 are locked in fixed positions with respect to one another by a number of bindings 7 extending spokefashion and at an angle of preferably twenty-four degrees from one another.

In the embodiment shown, each binding 7 is formed using a respective binding thread 8, conveniently a wire, which comprises an intermediate portion 9 wound from the inside about an inner peripheral turn 5 of coil 4, and two lateral or terminal portions 10, 11, which, as shown particularly in FIGS. 2 and 3, are wound about respective portions of turns 5, extend along respective separate undulated paths, and cross over up-and downstream from each of turns 5 to form a number of connected loop elements 13 each surrounding a respective turn 5.

As shown in FIG. 1, machine 1 comprises a fixed supporting frame 14; a winding station 15; and a powered forming drum 16 housed in station 15 and connected to frame 14 in known manner to rotate about a respective axis 17.

As shown particularly in FIGS. 2 and 3, drum 16 comprises a central hub 18, and two plate bodies 19 and 20 connected to hub 18 and defining, together with hub 18, an annular groove 22 having an outer peripheral input 23 and of adjustable axial width L.

More specifically, hub 18 comprises a bottom cylindrical portion 24; and a top annular flange 25 integral with and projecting outwards of portion 24, and defining, together with portion 24, an inner seat or cavity 26. Inwards, flange 25 defines groove 22, which houses a known retaining device (not shown) for retaining, in use, a number of ends of respective threads for winding and located in given positions as explained in detail later on.

Bodies 19 and 20 comprise respective annular plates 27 facing and parallel to each other, and which axially define groove 22, and are connected respectively to hub 18 by a cylindrical body 28 housed in seat 26, and by a collar 29 surrounding portion 24. Body 28 and collar 29 are both connected in axially-sliding, angularly-fixed manner to hub 18, and are connected integrally to hub 18 by known releasable connecting means (not shown). Both plates 27 have respective inner peripheral portions facing flange 25 and separated from flange 25 by respective spacers 30, which are selectable from a number of spacers of different thicknesses to vary the axial dimension of groove 22. In a variation not shown, spacers 30 are replaced by a continuously-adjustable, e.g. screw-nut screw, spacer device.

The portion of each plate 27 projecting beyond flange 25 comprises a number of radial slots 32 extending spokefashion from an outer peripheral edge of plate 27, and each corresponding with a slot 32 formed in the other plate 27. Slots 32 are separated by a given angle of conveniently twenty-four degrees.

As shown in FIG. 1, machine 1 also comprises, for each pair of facing slots 32, a respective binding device 33 (only one shown in FIG. 1) fitted in known manner (not shown) to and rotating together with drum 16, and which in turn comprises two gripping heads 34, 35 for gripping the opposite ends of binding thread 8, the intermediate portion 9 of which is placed, in use, contacting the end surface of groove 22, and the lateral portions 10, 11 of which each loosely engage, in use, a respective slot 32 (FIGS. 1 and 2). Each gripping head 34, 35 is moved in a direction substantially parallel to axis 17 by a respective known cam and tappet actuating device 36 (not described in detail) for moving respective head 34, 35 between a first and second limit position on opposite axial sides of groove 22 and the plane, perpendicular to axis 17, containing coil 4.

As shown in FIG. 1, machine 1 also comprises three unwinding stations 37, 38, 39 located outwards of station 15 and drum 16, and of which station 37 houses a reel (not shown) of ceramic thread 6, and stations 38, 39 each house a respective reel of auxiliary or spacer thread 40, 41, preferably a thread of elastomeric material or wire.

Operation of machine 1 and the formation of disk element 2 will now be described, for the sake of simplicity, with reference to one binding device 33, and as of the condition in which the ends of threads 6, 40, 41 are housed inside groove 22 and connected by said retaining device to drum 16 in angularly spaced positions one after the other in the rotation direction of drum 16, with the ends of threads 40 and 41 spaced axially and each contacting the inner surface of respective plate 27; heads 34 and 35 are set to their respective first positions on opposite sides of groove 22; the intermediate portion 9 of binding thread 8 is maintained contacting the end surface of groove 22 upstream from the end of thread 6 in the rotation direction of drum 16; and the lateral portions 10, 11 of binding thread 8 are retained by respective heads 34, 35 and converge towards each other and towards intermediate portion 9.

As of the above condition, and as drum 16 is rotated about axis 17, threads 6, 40, 41 are wound gradually about axis 17, so that thread 6 is inserted first between lateral portions 10 and 11 of binding thread 8 and onto intermediate portion 9 (FIG. 5a). At this point, before the end of thread 40 reaches binding thread 8, head 35 is maintained stationary in the first position, while head 34 is moved into the second position (FIG. 5b) adjacent to head 35 so as to partially wind lateral portion 10 of binding thread 8 about thread 6. At this point, the rotation of drum 16 gradually inserts thread 40 between respective plate 27 and lateral portion 10; head 34 is then restored to the first position, and head 35 moved into the second position, i.e. adjacent to head 34 (FIG. 5d), so that lateral portions 10 and 11 are wound partially about respective threads 40 and 6; and the rotation of drum 16 inserts thread 41 between respective plate 27 and lateral portion 11 (FIG. 5e). At the end of this step, head 35 is maintained stationary, while head 34 is moved into the second position so that lateral portions 10 and 11 cross over downstream from thread 6 (FIG. 5f) and again diverge ready to receive, at the next pass, a further portion of thread 6 (FIG. 5g) defining a further turn 5. The above steps are then repeated in the same order to wind the threads gradually about hub 18, so that thread 6 forms flat coil 4, and threads 40 and 41 form a further two flat coils 42 and 43 located on opposite sides of coil 4, and each having the same spacing P as coil 4, and comprising a number of turns 47, each housed at least partially between two respective adjacent turns 5.

Once coils 4, 42, 43 are completed, the end portions of binding thread 8 are connected integrally to each other in known manner to complete disk element 2 and binding 7 binding turns 5 of thread 6, and are released from heads 34, 35. At this point, bodies 19 and 20 are parted axially and disconnected from hub 18 (FIG. 3); an appropriate known manipulating device 45, shown schematically in FIG. 3, axially withdraws coil 42 defined by thread 40 and simply resting on coil 4 defined by thread 6 and bound by binding threads 8; disk element 2 (FIG. 4), which in turn simply rests on coil 43 defined by thread 41, is then withdrawn; and, finally, coil 43, simply resting on body 20, is detached from body 20 and hub 18, and is removed by a further known manipulating device 46 (shown schematically).

The disk elements 2 so formed are then stacked as shown in FIG. 6, with a matrix spacer sheet 47 interposed between one disk element 2 and the next, to form a stack 48, which is subsequently compressed axially in known manner to form a composite material comprising a matrix containing a number of reinforcing threads distributed evenly and with a given desired spacing.

As compared with known methods, the method and machine 1 described therefore provide for forming ceramic-fiber disk elements in which, in addition to being locked constantly in fixed mutual positions which are unchanged even when compressed axially, the various turns in each ceramic coil may comprise any spacing, in particular a spacing comparable with the diameter of the ceramic thread adopted. In fact, according to the method described, spacing P of turns 5 may be varied discretely by selecting an appropriate diameter of threads 40 and 41, and continuously, for a given selected thread diameter, by simply adjusting the axial dimension L of groove 22, i.e. the distance between plates 27. That is, a variation in the axial dimension of groove 22 varies the position of each spacer-thread coil 42, 43 with respect to ceramic-thread coil 4, i.e. the distance between coils 42 and 43, and consequently the spacing P of turns 5 of the ceramic thread.

Moreover, unlike known methods, the method and machine 1 described provide for forming disk elements of any thickness, even down to a thickness substantially equal to the diameter of ceramic thread 6. In fact, the thickness of disk elements 2 is practically determined solely by the diameter of ceramic thread 6, in that binding threads 8 are of extremely small diameter, while threads 40, 41 for spacing turns 5 are located completely outside both ceramic coil 4 and binding threads 8, and are removed at the end of the forming process.

Clearly, changes may be made to the method, machine 1 and disk element 2 as described and illustrated herein without, however, departing from the scope of the present invention. In particular, provision may be made for a different number of bindings 7, which may be formed, for example, by winding the same or a different number of binding threads 8 about turns 5 in other than the manner described by way of example.

As for the machine described, drum 16 and the devices for activating heads 34 and 35 may obviously differ from those described.

What is claimed is:

1. A method of producing a continuous-thread disk element (2) from which to produce composite materials, the method comprising the steps of feeding a continuous first thread (6) to a winding station (15); winding the continuous first thread (6) about an axis (17) to form a flat first coil (4) comprising a number of first turns (5); and locking the first turns (5) in fixed positions with respect to one another; characterized in that locking the first turns (5) with respect to one another comprises the steps of inserting removable spacer elements (40)(41) between each first turn (5) and the adjacent first turn; winding binding thread elements (8) about at least an intermediate portion of each first turn (5) to form a binding (7) solely surrounding the intermediate portions of said first turns (5); and removing said spacer elements (40)(41) from said first coil (4).

2. A method as claimed in claim 1, characterized in that insertion of said spacer elements (40)(41) between the first turns (5) and formation of said binding (7) take place simultaneously with the formation of the first turns (5).

3. A method as claimed in claim 1, characterized in that the formation of said binding (7) comprises the steps of winding two portions (10)(11) of binding thread (8) about the first turns (5) so that the two portions (10)(11) of binding thread (8) define an undulated, substantially radial path, and cross over each other up-and downstream from each first turn (5).

4. A method as claimed in claim 3, characterized in that the formation of said binding (7) comprises the further step of bending a binding thread (8) into a U and winding an intermediate portion (9) of the binding thread (8) about a peripheral first turn (5) of said first coil (4) prior to winding the remaining portions of the binding thread (8), defining said two portions (10)(11) of binding thread (8), about the first turns (5).

5. A method as claimed in claim 3, characterized in that the insertion of said spacer elements (40)(41) comprises the steps of curving, simultaneously with the formation of the first coil (4), two second spacer threads (40)(41) about said axis (17) to gradually form a flat second (42) and third (43) coil on opposite sides of the first coil (4); positioning, simultaneously with the formation of said second (42) and third (43) coil, said two second spacer threads (40)(41) against said first thread (6) and against respective said portions (10)(11) of binding thread (8); and retaining said two second spacer threads (40)(41) in contact with said first thread (6) and said portions (10)(11) of binding thread (8).

6. A method as claimed in claim 5, characterized in that the insertion of said second spacer threads (40)(41) comprises the steps of winding a portion of a first (10) of said portions (10)(11) of binding thread (8) about said first thread (6); positioning a first (40) of said second spacer threads (40)(41) on the outside of said first portion (10) of binding thread and downstream from said first thread (6); winding a portion of a second (11) of said portions (10)(11) of binding thread (8) about the first thread (6); and positioning a second (41) of said second spacer threads (40)(41) on the outside of said second portion (11) of binding thread prior to crossing the portions (10)(11) of binding thread downstream from the first thread (6).

7. A method as claimed in claim 5, characterized in that said second spacer threads (40)(41) are retained contacting said first thread (6) and said portions (10)(11) of binding thread (8) by inserting each said second spacer thread (40)(41) between said portions (10)(11) of binding thread (8) and a respective retaining surface (27).

8. A method as claimed in claim 6, characterized in that said portions of binding thread (8) are wound about said first thread (6) by moving said first portion (10) of binding thread (8) from an original position towards said second portion (11) of binding thread (8), and then moving both said portions (10)(11) of binding thread (8) back into said original position after positioning one of said second spacer threads (40)(41) on said first portion (10) of binding thread (8).

* * * * *